No. 735,455. PATENTED AUG. 4, 1903.
J. BRANDON.
COTTON GIN.
APPLICATION FILED AUG. 2, 1902.
NO MODEL. 4 SHEETS—SHEET 1.

Witnesses:
D. W. Gardner
F. E. Roach

Inventor:
James Brandon
By his Attorney
Geo. W. Miatt

No. 735,455. PATENTED AUG. 4, 1903.
J. BRANDON.
COTTON GIN.
APPLICATION FILED AUG. 2, 1902.
NO MODEL. 4 SHEETS—SHEET 2.

Witnesses:
D. W. Gardner
F. E. Roach

Inventor:
James Brandon
By his Attorney

No. 735,455. PATENTED AUG. 4, 1903.
J. BRANDON.
COTTON GIN.
APPLICATION FILED AUG. 2, 1902.
NO MODEL. 4 SHEETS—SHEET 3.
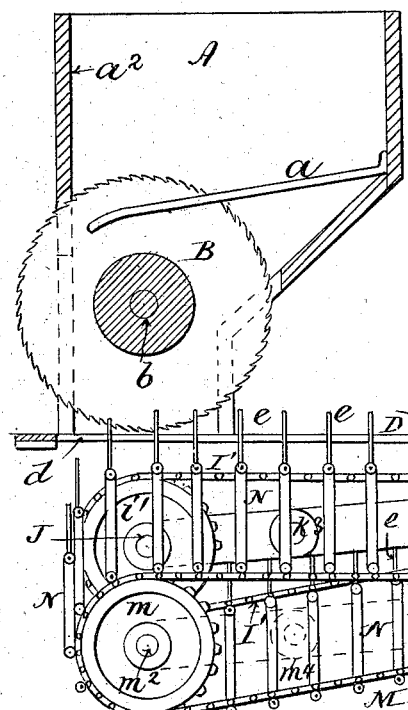
Fig. 5.
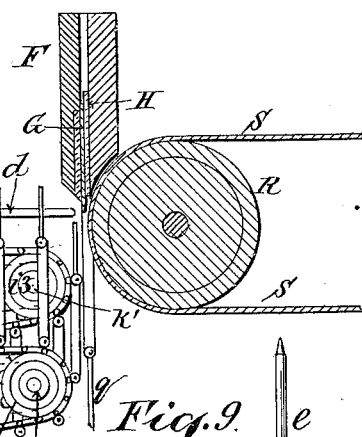
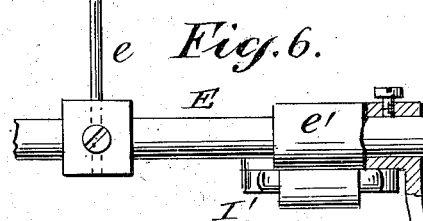
Fig. 6.
Fig. 8.
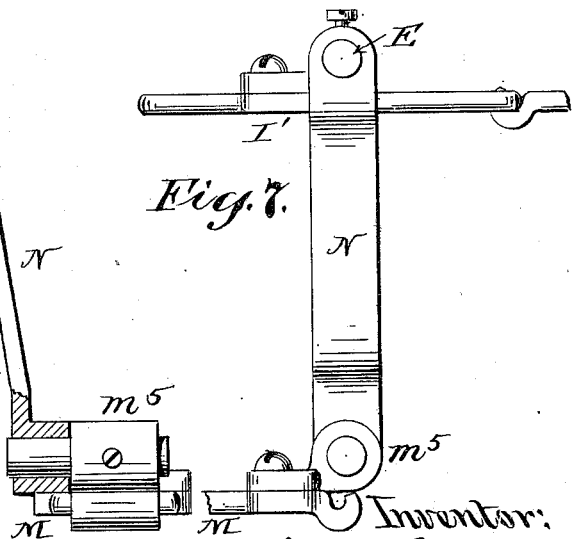
Fig. 7.
Witnesses:
D. W. Gardner.
F. E. Roach.
Inventor:
James Brandon
By his Attorney
Geo. Wm. Miatt
THE NORRIS PETERS CO., PHOTO-LITHO., WASHINGTON, D. C.

No. 735,455. PATENTED AUG. 4, 1903.
J. BRANDON.
COTTON GIN.
APPLICATION FILED AUG. 2, 1902.
NO MODEL. 4 SHEETS—SHEET 4.

Witnesses.
D. W. Gardner
F. E. Roach

Inventor:
James Brandon
By his Attorney
Geo. Wm. Miatt

No. 735,455. Patented August 4, 1903.

UNITED STATES PATENT OFFICE.

JAMES BRANDON, OF NEW YORK, N. Y.

COTTON-GIN.

SPECIFICATION forming part of Letters Patent No. 735,455, dated August 4, 1903.

Application filed August 2, 1902. Serial No. 118,125. (No model.)

*To all whom it may concern:*

Be it known that I, JAMES BRANDON, a citizen of the United States, residing in the city of New York, county and State of New York, have invented certain new and useful Improvements in Cotton-Gins, of which the following is a specification sufficient to enable others skilled in the art to which the invention appertains to make and use the same.

The object of my invention is to effectually open up seed-cotton before presenting it to the ginning mechanism to get rid of sand and other impurities, so that the seed may be readily wiped out or separated from the loose lint by the stripping mechanism without strain or injury to the fiber, as hereinafter set forth.

Figure 1:
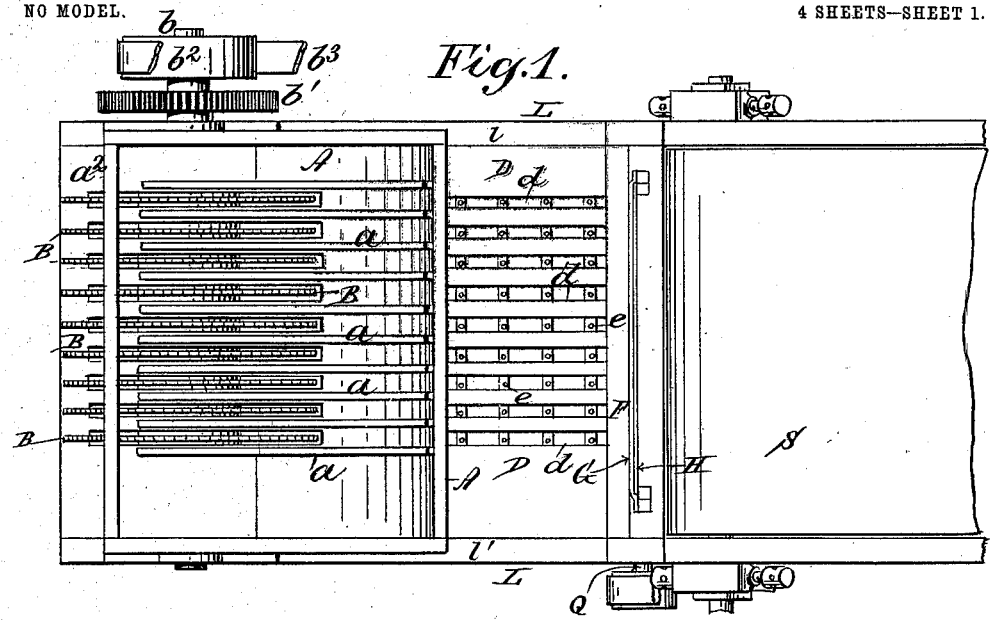
Figure 2:
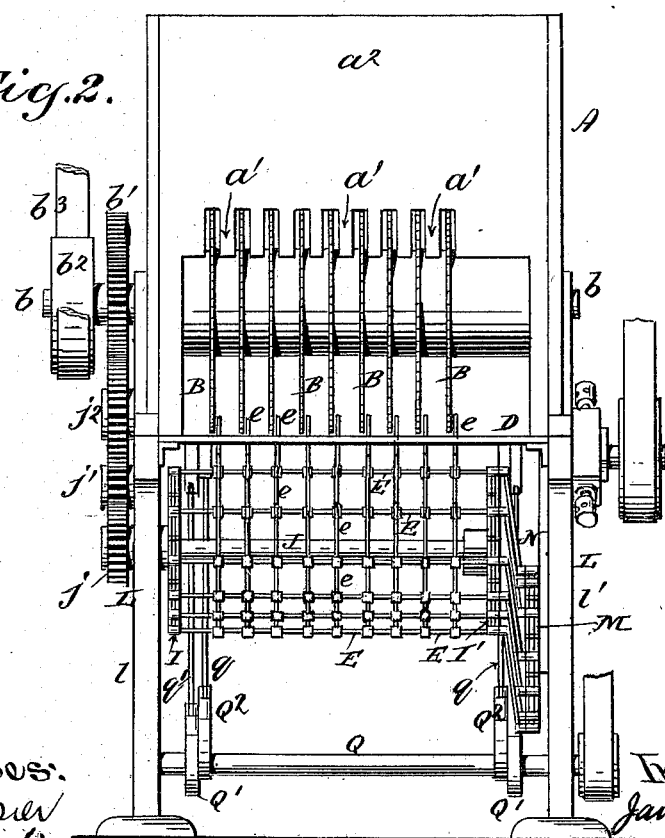
Figure 3:
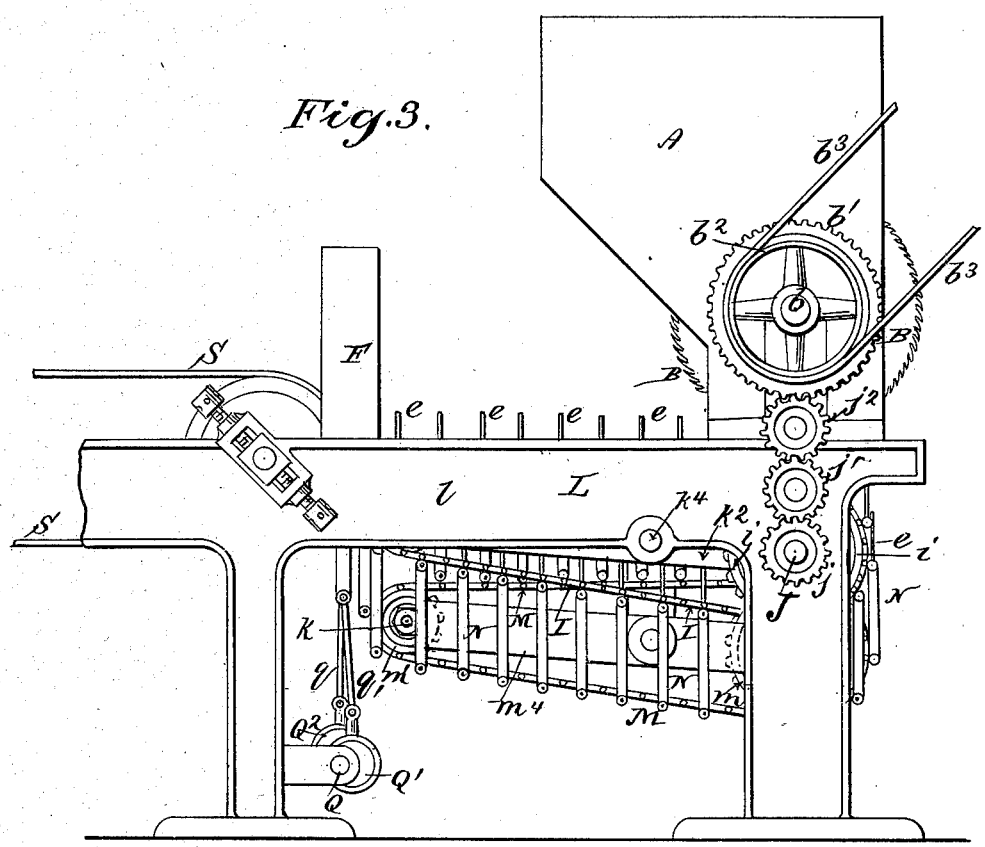
Figure 4:
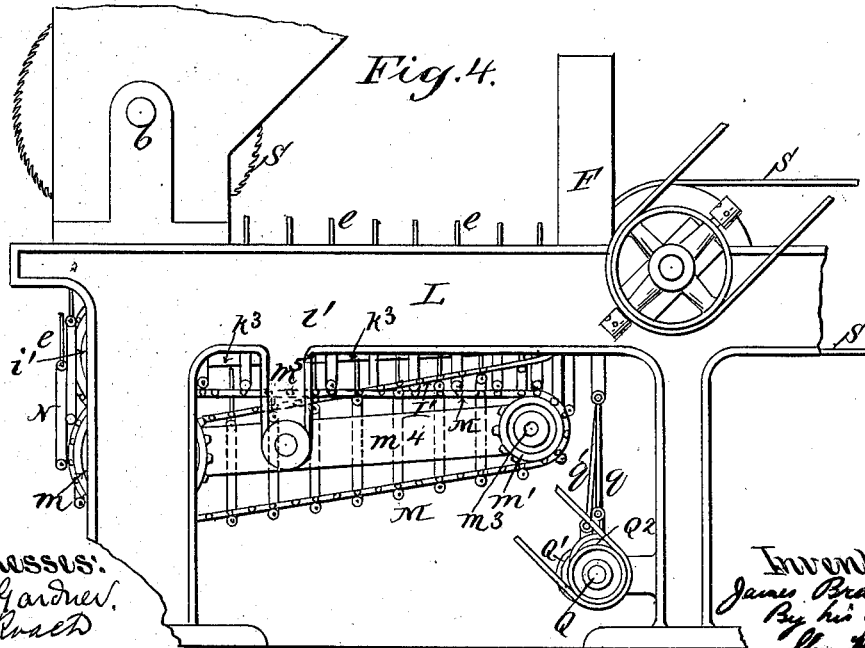
Figure 10:
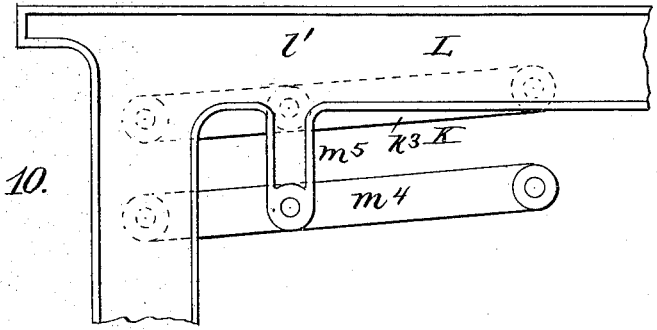
Figure 11:
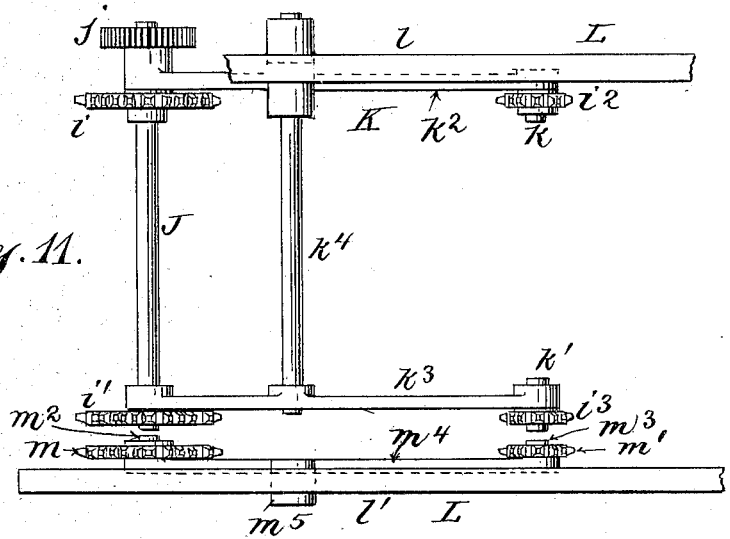

In the accompanying drawings, Figure 1 is a plan of my improved cotton-gin; Fig. 2, an end view of the same. Figs. 3 and 4 are elevations of opposite sides of the apparatus. Fig. 5 is a sectional diagram illustrating the relation and operation of the main parts of my apparatus; Figs. 6, 7, 8, and 9, detail views, upon an enlarged scale, of the forwarding mechanism. Figs. 10 and 11 are respectively side and top views of the framework which supports the automatic feed mechanism.

The feed box or hopper A is formed with a grating $a$, upon which the seed-cotton is deposited. Between the bars of this grate $a$ project the upper portions of the saws B, mounted upon the shaft $b$. Tongues $a'$, formed on the wall $a^2$ of the hopper A, project downward between the saws, forming slots through which the seed-cotton is withdrawn from the hopper similar to the manner in which seed-cotton is treated in the older forms of cotton-gins, with this exception, however, that whereas in the old form of saw-gin the slots through which the saws protruded are not wide enough to allow the cotton-seed to pass. In the present case they are purposely made of sufficient width to allow the seeds in the boll to pass freely, the tongues $a'$ acting not as seed-eliminators, but simply to retard and open up the cotton bolls as they are withdrawn by the saws from the feed-box A. The seed-cotton is carried by the saws B to the feed board or table D, formed with a series of longitudinal slots $d$, through which project forwarding-fingers $e\,e$, which travel toward the breast F and stripper-blades G H at a speed slightly greater than the peripheral speed of the saws B, so that the fingers $e\,e$ in taking the cotton from the saws open up and attenuate the bolls still further. This result is supplemented and augmented by the resistance afforded by the frictional contact of the seed-cotton with the table D as it is drawn over by the fingers $e\,e$, which thus continues to open out the fiber until the cotton reaches the breast and stripper-blades, the fingers $e\,e$ being sufficiently far apart to insure looseness and freedom of fiber.

The feed-fingers $e\,e$ are attached rigidly to transverse rods E E, mounted upon and between parallel endless chains I I', passing over sprocket-wheels $i\,i'$ and idlers $i^2\,i^3$. The sprocket-wheels $i\,i'$ are rigidly secured to a shaft J, mounted on a frame K, supported upon one side member only, $l$, of the main frame L of the apparatus, the idlers $i^2\,i^3$ being also mounted (on studs $k\,k'$) upon the said frame K. This frame K consists, essentially, of two cross-bars $k^2\,k^3$, secured rigidly to the arm $k^4$, projecting from the side member $l$ of the main frame L, as above stated, the object being to support the sprocket-chains I I'; sprocket-wheels $i\,i'$, and idlers $i^2\,i^3$ in such manner as to admit of the use of an auxiliary endless chain M, passing over the idlers $m\,m'$, mounted respectively upon studs $m^2\,m^3$ on the cross-bar $m^4$, secured to the bracket or extension $m^5$ on the opposite side member $l'$ of the main frame L, as will be understood by reference more particularly to Figs. 10 and 11 of the drawings.

The shaft J and sprocket-wheels $i\,i'$ are rotated by means of a gear $j$, secured to said shaft J and actuated through intermediate gearing $j'\,j^2$ by the gear $b'$ upon the shaft $b$, carrying the pulley $b^2$, to which the power-belt $b^3$ is applied, it being understood, as before intimated, that the speed imparted to the endless belts I I' and hence to the rods E E and fingers $e\,e$ is greater than the peripheral speed of the saws B.

In order to avoid injury to the cotton fiber, I cause my forwarding-fingers $e\,e$ to enter and leave the seed-cotton upon the table at substantially right angles to the latter.

The rods E are mounted loosely in bearings $e'\,e'$, attached to alternate links of the endless chains I I', so that said rods would be free to turn upon their longitudinal axes were they not otherwise held by the controlling-arms N, so that in reality the bearings $e'$ $e'$ may be said to be free to turn upon the rods E. A controlling-arm N is rigidly attached to each finger-rod E, the lower end of the controlling-arm being pivotally connected with one of the bearings $m^5$ on the endless auxiliary chain M. The idlers $m$ $m'$ are of the same diameters, respectively, as the sprocket-wheels $i$ $i'$ and idlers $i^2$ $i^3$ are arranged so that the auxiliary chain M is parallel to the endless chains I I', although occupying a lower level. It will thus be seen that the controlling-arms N being rigidly attached to the finger-rods E and pivotally attached to the endless auxiliary chain M will hold the fingers $e$ $e$ in the same prescribed position throughout their endless journey, preferably a position substantially at right angles to the feed-table D, as shown in the drawings. I have found by actual experiment that it is not necessary to apply power directly to the chain M or idlers $m$ $m'$, the frictional resistance afforded to their movement by reason of their pivotal connection with the arms N being so slight as not to interfere with or retard the action of the chain I' and connections. In fact, the chain M is designed to act simply as a parallel drag to maintain the said arms N, finger-rods E, and forwarding-fingers $e$ $e$ constantly at a prescribed angle with relation to the feed-table D. As a result the said fingers $e$ $e$ enter and leave the seed-cotton gently, without tearing, twisting, or snarling the same. This feature is of especial importance at the end of the feed where the seed-cotton is delivered to the stripping mechanism, since the fingers $e$ $e$ sink below the table and away from the cotton without straining, breaking, or tearing the same, as they would inevitably do were they to pass around the idlers in a radial position. As thus fed to the ginning or stripping mechanism the bolls of seed-cotton are in the form of loose attenuated slivers, from which the seed can be readily extracted without injury to the cotton fiber.

My cotton-boll opening and feeding mechanism may obviously be employed in connection with various forms of stripping or ginning devices, and I do not limit or restrict myself in this respect, although I herein show and claim a specific form of stripping mechanism which is especially adapted for use in this connection. This seed-extracting mechanism consists, essentially, of two stripper-plates G H, sliding one over the other and supported in a suitable frame or breast F. These plates G H are made to reciprocate simultaneously in opposite directions through the medium of rods $q$ $q'$ by means of eccentrics $Q'$ $Q^2$ on a power-shaft Q. They are so arranged that their lower ends vibrate between the inner edge of the feed-table D and the ginning-roller R and belt S, so that as the slivers are drawn by the ginning-roller and belt from the feed-table D the seeds are literally knocked down and out of the cotton fiber by blows delivered, substantially, at right angles to the line of feed. Thus the function of the vibrating plates is simply to extricate and eliminate the seed from the fiber, and they are not relied upon also to open up and disintegrate the seed-cotton bolls, as heretofore. In fact, I am not aware of any other practicable automatic feed for seed-cotton in which the cotton bolls are opened up and attenuated before presentation to the ginning mechanism. The seed-cotton is usually fed to the ginning device in a more or less matted compact mass, which has to be opened up and literally torn apart by the ginning mechanism before the latter can extract the seed, resulting in serious injury to the fiber and the clogging of the apparatus to such an extent that it has to be stopped frequently and cleared. In my apparatus clogging is practically impossible, since the cotton bolls are opened up and combed out into comparatively thin attenuated slivers in which the fibers are elongated and parallel to each other, the seed being loosened from the fiber to such an extent that it is wiped out by the stripping mechanism without tangling or straining the fiber. As a result a higher, more uniform, and valuable grade of cotton is attained continuously and rapidly as compared with the prior state of the art, the output being more than doubled for a given size of apparatus. In thus opening up the cotton bolls and combing out the fiber as a preliminary to subjecting the seed-cotton to the action of the stripping mechanism I also eliminate sand and other heavy material that would otherwise tend to injure the fiber during the wiping out of the seed as well as impair its quality. The opening up of the cotton bolls by the saws and intervening tongues without extracting the seed from the cotton as it passes from the hopper is an important feature in that it loosens the seed and prepares the seed-cotton for the combing action of the forwarding-fingers, so contributing materially to the elimination of the seed without injury to the cotton lint.

By my method of opening up and attenuating the boll of cotton preparatory to subjecting it to the action of the stripping mechanism I avoid all danger of sparking or combustion by reason of the contact of the strippers with flinty or metallic substances in the seed-cotton as heretofore treated, since flinty and other foreign substances are eliminated by gravity as the seed-cotton is opened up and drawn over the feed-table by my improved automatic feed.

What I claim as my invention, and desire to secure by Letters Patent, is—

1. In cotton-ginning apparatus, the combination of a receiving-hopper, a series of saws arranged to remove the seed-cotton through slots in said hopper and deposit it on a feed-board, said feed-board formed with a series of longitudinal slots, a series of forwarding-fingers projecting through said slots and mechanism for carrying said forwarding-fingers and maintaining them in positions parallel to each other and substantially at right angles to the feed-board together with seed-stripping mechanism arranged at the end of the feed-board, substantially in the manner and for the purpose set forth.

2. In cotton-ginning apparatus, the combination of a receiving-hopper formed with a series of slots of greater width than the cottonseed, a series of saws arranged to remove the seed-cotton through said slots and deposit it on a feed-board, said feed-board formed with a series of longitudinal slots, a series of forwarding-fingers projecting through said slots, and mechanism for carrying said forwarding-fingers and maintaining them in positions parallel to each other and substantially at right angles to the feed-board, together with seed-stripping mechanism arranged at the end of the feed-board, substantially in the manner and for the purpose set forth.

3. In a cotton-ginning apparatus, the combination of a receiving-hopper, a series of saws arranged to remove the seed-cotton through slots in said hopper and deposit it on a feed-board, said feed-board formed with a series of longitudinal slots, a series of feeding-fingers rigidly attached to transverse bars, a forwarding-chain, said transverse bars pivotally connected to said forwarding-chain, an auxiliary endless chain, a series of controlling-arms rigidly attached to said transverse finger-carrying bars and pivotally connected to said auxiliary endless chain, said auxiliary endless chain arranged parallel to but on a plane lower than the aforesaid endless forwarding-chain, and means for supporting said auxiliary endless chain in such manner that it may rotate at the same rate of speed as the aforesaid endless forwarding-chain, together with seed-stripping mechanism arranged at the end of the feed-board, substantially in the manner and for the purpose set forth.

4. In cotton-ginning apparatus, the combination of the receiving-hopper formed with a series of slots of greater width than the cottonseed, a series of saws arranged to remove the seed-cotton through said slots and deposit it upon a feed-board, said feed-board formed with a series of longitudinal slots, a series of parallel feeding-fingers arranged to enter and recede from said slots at substantially right angles to the feed-board, endless chain mechanism for supporting said fingers and imparting a speed to them greater than that of the peripheral speed of the said saws, and seed-stripping mechanism arranged at the end of the feed-board, substantially in the manner and for the purpose set forth.

5. In cotton-ginning apparatus, the combination of a receiving-hopper, a series of saws arranged to remove the seed-cotton through slots in said hopper and deposit it on a feed-board, said feed-board formed with a series of longitudinal slots, and a series of forwarding-fingers projecting through said slots and carried by mechanism which maintains said forwarding-fingers in positions parallel to each other and substantially at right angles to the feed-board, together with seed-stripping mechanism, consisting of two reciprocating plates one upon the other, their lower stripping ends being interposed between the end of the feed-board and the device for withdrawing the cotton sliver, together with said sliver-removing device, substantially as set forth.

JAMES BRANDON.

Witnesses:
D. W. GARDNER,
F. E. ROACH.